Oct. 2, 1956          M. A. LOGAN          2,765,442

CALIBRATION CIRCUIT

Filed Feb. 9, 1953          2 Sheets-Sheet 1

INVENTOR
M. A. LOGAN
BY
Walter M. Hill
ATTORNEY

Oct. 2, 1956  M. A. LOGAN  2,765,442
CALIBRATION CIRCUIT
Filed Feb. 9, 1953  2 Sheets-Sheet 2

INVENTOR
M. A. LOGAN
BY
Walter M. Hill
ATTORNEY

United States Patent Office 2,765,442
Patented Oct. 2, 1956

2,765,442

CALIBRATION CIRCUIT

Mason A. Logan, New Providence, N. J., assignor to Bell Telephone Laboratories, Incorporated, New York, N. Y., a corporation of New York Application February 9, 1953, Serial No. 335,971

3 Claims. (Cl. 324—74)

This invention relates to the art of electrical measurements and more particularly to an apparatus for calibrating a peak reading voltmeter.

It is a known fact that peak voltmeters embodying electronic amplifiers have an inherent bandwidth limitation such that they become rather inaccurate when reading peak voltages of waves having a short time duration. It has been found that, even though a peak voltmeter is calibrated to read correctly for one wave form, it is not likely to read correctly for other wave forms materially different from the one for which the instrument was calibrated. It, therefore, becomes necessary to have some means of calibrating a peak voltmeter to read correctly when measuring peak voltages of highly peaked wave forms.

It is an object of this invention to provide a calibrating circuit adapted to calibrate a peak reading voltmeter to read peak voltages of any one arbitrary wave form.

The above object is achieved by this invention which provides means for calibrating a peak voltmeter directly from a variable peak voltage source of the same wave form that the meter is subsequently to measure. The calibrating circuit comprises a biased limiter circuit connected across the meter, the bias source being a variable known reference voltage. Means are provided for gradually increasing the peak voltage until it approaches the bias voltage at which point the meter ceases to increase its deflection, thereby accurately determining the peak voltage applied to the meter. Alternatively, the bias voltage may be lowered to equal the peak voltage, at which point the meter deflection begins to lower.

The invention may be better understood by referring to the accompanying drawings in which:

Fig. 1 discloses an experimental circuit for demonstrating the inaccuracy of a peak voltmeter when measuring waves of different shape;

Figure 5:
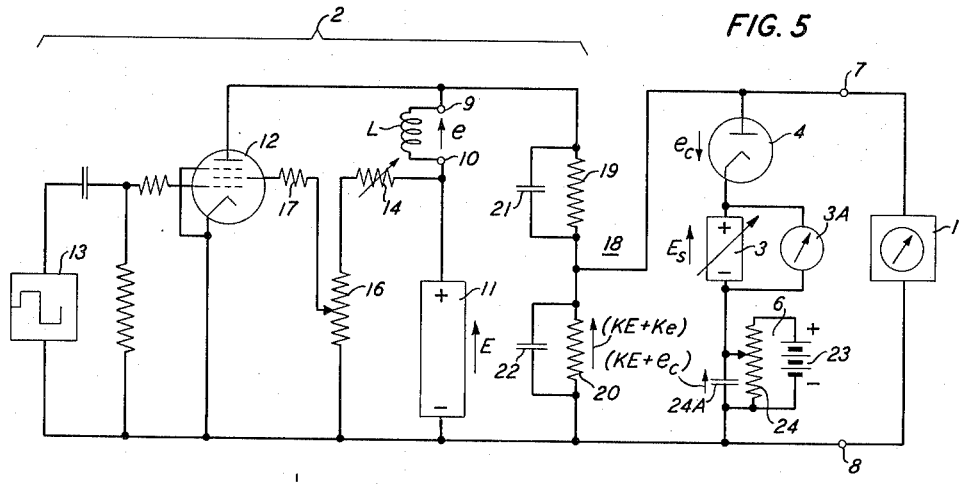
Figure 6:
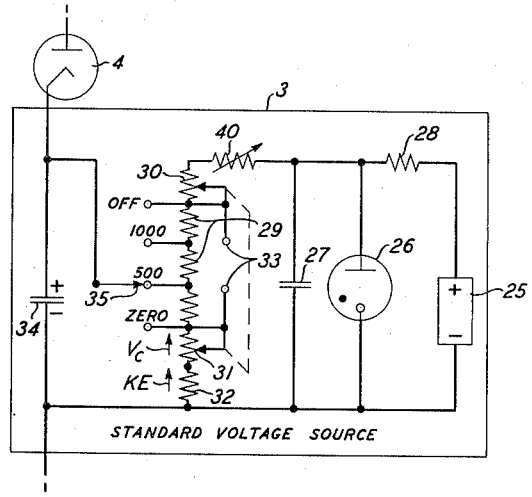
Figure 7:
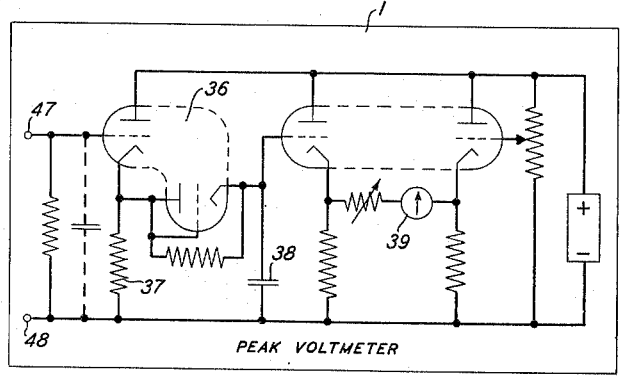

Fig. 5 discloses an embodiment of the invention as applied to a test set for measuring peak voltages generated in inductors;

Fig. 6 shows one form of standard voltage source which may be used in the practice of this invention; and Fig. 7 is illustrative of one form of peak voltmeter which may be calibrated by the apparatus of this invention.

Figure 1:
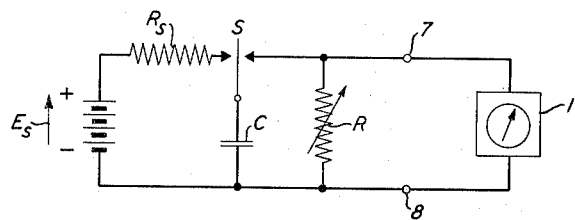
Figure 2:
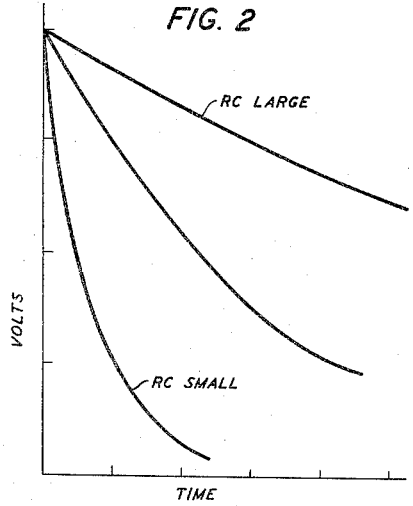
Figs. 2 and 3 are experimental curves obtained with the apparatus of Fig. 1.

Referring now to Fig. 1 it will be noted that the vacuum tube voltmeter 1, which is assumed to be adapted for reading peak voltages, is connected across a variable resistor R through test terminals 7 and 8. A source of known voltage $E_s$ is connected in series with a relatively small current limiting resistor $R_s$. A single-pole, double-throw switch S is arranged to alternately connect the capacitor C to the source of voltage $E_s$ in series with the resistor $R_s$ and then to connect the charged capacitor across resistor R. It will be understood that when the capacitor C is connected to the voltage source it will rapidly charge to a voltage equal to that of the source and that when the switch is connected to the resistor R, the capacitor will discharge therethrough so that the voltage across the resistor will fall exponentially as shown by the curves in Fig. 2. Resistor R is made variable so as to vary the discharge time constant and consequently the shape of the voltage pulse applied to the meter connected to terminals 7 and 8. Fig. 2 shows the output voltage waves for three different time constants.

Figure 3:
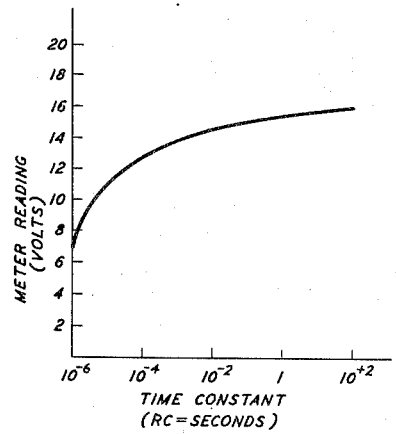

In Fig. 3, it will be noted that the meter reading is plotted against the time constant determined by the capacitance of capacitor C and the resistance of resistor R in Fig. 1. This curve was experimentally obtained from a commercially available meter but is typical of the response of most any conventional vacuum tube peak voltmeter. It will be noted that as the time constant is shortened the indication of the meter falls off considerably so that when the time constant is about one microsecond in duration the meter reads something less than one-half the actual peak voltage. This demonstrates the necessity for using a calibrating source of the same wave form as that which is subsequently to be measured.

Figure 4:
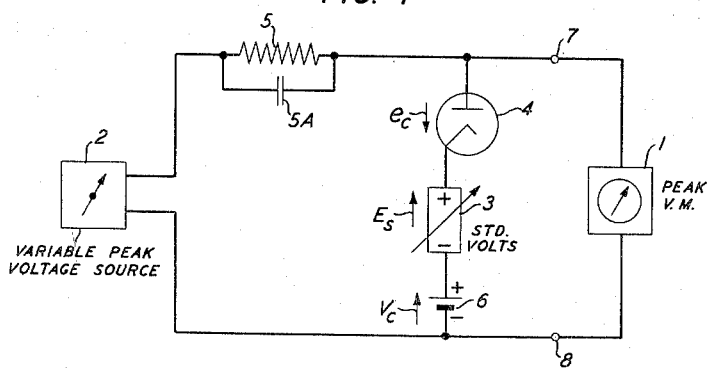
Fig. 4 shows an embodiment of the invention in its simplest form.

The invention is illustrated in its simplest form in Fig. 4 wherein a source of variable peak voltage 2 is shown connected to a pair of test terminals 7 and 8. A resistor 5 and a shunting capacitor 5A are connected in series with source 2 to increase the source impedance where necessary. Resistor 5 and capacitor 5A are chosen to have the same time constant as the input impedance of the voltmeter 1. The voltmeter 1 to be calibrated is connected to test terminals 7 and 8. Connected directly across the test terminals 7 and 8 is a limiter circuit comprising a source of standard voltage 3 in series with a vacuum tube diode 4. Other types of unilateral conductors, for example copper oxide or selenium rectifiers, may be substituted for the diode 4, but where rather high voltages with steep wave fronts are to be used it is ordinarily preferred that a vacuum tube diode be used because of its low capacity.

All vacuum tube diodes are known to have an inherent internal electromotive force which is represented by the voltage vector $e_c$ in Fig. 4. In order that the standard voltage $E_s$ will truly represent the calibrating voltage, it is desired to balance out this internal electromotive force. This is preferably done by connecting a separate voltage source, symbolically represented as a battery 6, in series with the limiter circuit and with polarity opposite that of the electromotive force of the diode. This voltage $V_c$ is made to just equal the internal electromotive force $e_c$ of the diode, which is conveniently done by setting $E_s$ to zero and slowly lowering the voltage of source 6 by conventional means until meter 1 just begins to deflect.

The apparatus of Fig. 4 may be used in either of two ways. If it is desired to calibrate a predetermined series of peak voltage values on the meter scale, the standard voltage source 3 may have its voltage $E_s$ adjusted to equal each of the voltages of this series after taking into account the voltage fractionating effect of network 5, 5A in series with the peak voltmeter 1. At each setting of voltage $E_s$ the variable peak voltage source 2 is gradually increased in voltage until the meter 1 under calibration ceases to increase its deflection. This indicates the point at which the fractionated value of the peak voltage from source 2 is exactly equal to the standard voltage $E_s$ of source 3. As the voltage of source 2 is increased further it only results in current flow through the calibration circuit so that the excess voltage appears across resistor 5. The known voltage may be inscribed on the scale of meter 1 or recorded with the reading of the meter scale for future reference in accordance with conventional practice.

The alternative manner in which the apparatus of Fig. 4 may be employed comprises first raising the standard voltage $E_s$ to some relatively high value so that the limiter action is temporarily disabled. The voltage from source 2 is then adjusted until a desired deflection is obtained on the meter 1. Following this the standard voltage of source 3 is gradually lowered until a point is reached where the deflection on meter 1 just starts to lower. The fractionated value of the peak voltage of source 2 at this point is then equal to this value of the standard voltage $E_s$.

In either case, it is to be understood that the wave form of source 2 is the same as that which is subsequently to be measured by meter 1. The reason for this becomes quite apparent when it is observed how the wave form affects the response of such meters as demonstrated by the curve of Fig. 3.

The circuit of Fig. 5 illustrates a practical application of this invention as it may be embodied in a test circuit for testing the insulation of an inductor L by measuring the peak voltage generated therein. The apparatus embraced generally by the reference numeral 2 corresponds with the variable peak voltage source 2 of Fig. 4. In Fig. 5 the peak voltage is generated by a sudden collapse of the magnetic field in inductor L, thereby generating a voltage represented by the voltage vector $e$, shown between the test terminals 9 and 10. The magnetic field is established in coil L by reason of a current therein from a voltage source 11. When the coil is connected to terminals 9 and 10, current may be caused to flow from the upper terminal of source 11 through the coil, through the anode-cathode space path of tube 12 and back to the source 11 through an obvious path. Tube 12 comprises preferably one or more tubes, preferably pentodes, connected in parallel.

The control electrode of tube 12 may be given a regular succession of positive pulses from a square wave generator 13. The input circuit to tube 12 from source 13 is by way of a conventional network requiring no detailed description. The screen grid of tube 12 is supplied with a positive bias from source 11 through a variable resistor 14 and a potentiometer 16. The screen grid is connected to the slider of potentiometer 16 through a protective resistor 17. It will thus be understood that the potential applied to the screen grid may be determined by adjusting the slider of potentiometer 16 and that the maximum potential which may be obtained from the potentiometer is under control of variable resistor 14.

As the positive pulse from generator 13 is received by the control electrode of tube 12, a current is established through coil L of magnitude determined by the setting of potentiometer 16, since the amount of current which a pentode will take through its anode-cathode circuit is under control of the potential on its screen grid. Each time that the negative pulse is received by the control grid from source 13, the tube is driven beyond cut-off so that the current through the tube and through coil L from source 11 suddenly reduces to zero. The resulting electromotive force developed in the coil produces a current through the potential divider 18 comprising resistors 19 and 20. Capacitors 21 and 22 are provided to maintain exact voltage division regardless of the steepness of the wave front. The value of resistor 20 and capacitor 22 are such as to take into account the input impedance of meter 1. The voltage appearing across resistor 20 is a definite fixed fractional part K of the voltage $e$ generated in coil L plus the same fractional part of the voltage E of source 11. This voltage will have a wave form determined by the distributed capacity, the inductance and the resistance of coil L.

In order to test the insulation properties of a coil, it is necessary to know what peak voltage is developed by a satisfactory coil under predetermined standardized conditions of initial current flow. These conditions are determined by other means of no importance to the understanding of this invention. Because of the relative simplicity of the calibrating apparatus of this invention it is both convenient and feasible to include it as a regular component of the test set. In fact, a defective coil may generate a wave form quite different from that of a good coil so that if the peak voltage is to be measured, the calibrating apparatus must be used with the meter in order to measure it. In Fig. 5, this calibrating apparatus is similar to that shown in Fig. 4, except that a meter 3A has been connected across standard source 3 to illustrate one convenient way of directly indicating the magnitude of its voltage. Also, the source 6 is shown as a conventional arrangement of a battery 23 and a potentiometer 24. The voltage determined by the adjustment of potentiometer 24 is such as to just offset the internal electromotive force $e_c$ of the diode 4 as well as the effect of the constant voltage E of source 11 as it appears across resistor 20. This voltage, when properly adjusted, is equal to $KE + e_c$. Capacitor 24A is preferably connected, as shown, to by-pass the clipped pulses of current coming through diode 4. The calibrating apparatus of Fig. 5 may be used in essentially the same way as has been already described for the apparatus of Fig. 4.

Another form of standard voltage source is shown in the calibration circuit of Fig. 6. If it sometimes found very convenient when used in connection with apparatus of the type shown in Fig. 5. This type of standard source becomes convenient when it is desired to determine only whether or not the peak voltage generated in the coil equals or exceeds certain predetermined specification limits for that coil without regard to the actual voltage value. In Fig. 6 a constant voltage source is provided by a direct-current source 25, a gaseous regulator tube 26, a capacitor 27 and a resistor 28. It will be observed that this comprises a conventional regulator circuit for establishing a substantially constant voltage across the terminals of capacitor 27. Across the terminals of capacitor 27 is found a voltage divider circuit comprising a variable resistor 40 which is connected in series with a plurality of resistors 29 and a pair of variable resistors 30 and 31. An additional resistor 32 is also inserted in series with these resistors to provide the fixed voltage KE used to offset the effect of the voltage E from source 11 in Fig. 5. A pair of terminals 33 are connected to the sliders of variable resistors 30 and 31 to which may be temporarily connected an external voltmeter, not shown. This meter should have a very high resistance compared with the total resistance of the divider circuit between terminals 33. With the meter thus connected to terminals 33, variable resistor 40 is adjusted until a predetermined voltage exists across terminals 33 as observed by the external meter. This will establish a predetermined current through the voltage divider circuit and thus establish the correct voltage KE across fixed resistor 32 as well as the correct voltages between the several taps on resistors 29. The voltage $V_c$ for balancing the voltage $e_c$ of diode 4 appears across resistor 31 and this voltage is adjusted by varying resistor 31 until the internal electromotive force of diode 4 is just balanced. This is very simply done by first connecting a short circuit across test terminals 9 and 10, adjusting voltage $E_s$ to zero and then lowering the resistance of resistor 31 until the meter 1 just begins to deflect. In order to avoid any variation of current in the divider circuit when resistor 31 is varied, a substantially identical variable resistor 30 is ganged with it in such a way that its resistance lowers by the same amount as the resistance of resistor 31 is increased and vice versa. A capacitor 34 is connected across the output circuit of the voltage divider network to by-pass the clipped pulses of current coming through the diode 4 so as to avoid any impairment of its clipping action which would occur due to this current otherwise flowing through the divider resistors.

The several taps provided on the divider resistors 29 may be marked to correspond with the voltage which must appear at test terminals 9 and 10 of Fig. 5 to cause the limiter circuit to just begin to take current. Since resistors 31 and 32 balance out the effects of the voltage from source 11 and the internal electromotive force of the diode 4, the difference voltage appearing between the tap marked "Zero" and any other voltage tap of the divider will represent the minimum value of the induced voltage component of coil L which just starts conduction through the limiter. The tap marked "Off" corresponds with a coil voltage above any required for the coils to be tested. Consequently, when brush 35 is placed on this tap, the limiter circuit is disabled for any voltage within the specification range.

The connection of the apparatus of Fig. 6 into the circuit of Fig. 5 to replace the calibration circuit thereof is believed obvious and when so connected it is preferably employed by simply placing the brush 35 on the voltage tap corresponding with that stated in the specification for the coil under test. Voltage from source 2 is gradually increased by raising the slider of potentiometer 16. This will gradually increase the recurrent surge voltage obtained from coil L. The peak voltage will continue to increase as indicated by a steadily increasing deflection of meter 1 until the limiter action of the calibration circuit takes place. The meter deflection at this point represents the true peak voltage corresponding with the selected voltage tap in the calibration circuit for the particular wave form of the coil used. Other points on the meter scale may be calibrated in the same manner.

Fig. 7 shows one form of peak voltmeter which may be calibrated by the apparatus of this invention. In this figure the first section of tube 36 comprises a cathode follower stage having a cathode resistor 37. The voltage output of this stage is rectified by the second section of tube 36 which is connected as a diode. The rectified current charges capacitor 38 to a voltage which is intended to be equal to the peak voltage applied to terminals 47 and 48. The curve of Fig. 3 is typical of the kind of response that is obtained from a peak voltmeter of the type shown in Fig. 7 so that as the duration of the voltage wave becomes less, the meter error increases rapidly. This is due to the fact that capacitor 38 does not charge to the full peak voltage because of parasitic effects resulting in a finite bandwidth for this type of meter. The direct voltage appearing on capacitor 38 is applied to the input circuit of a conventional balanced vacuum tube voltmeter and may be read directly by the indicator 39. This voltmeter may be calibrated by the apparatus of this invention by connecting its input terminals 47 and 48 to test terminals 7 and 8 of either Fig. 4 or Fig. 5. The method of calibrating may be either of those described for Fig. 4.

What is claimed is:

1. A calibration circuit for calibrating peak voltmeters comprising a variable peak voltage source having a wave form substantially the same as that to be measured by the meter to be calibrated, a pair of terminals for connection to said meter, means connecting said source to said terminals, and a voltage limiter connected across said terminals, said limiter comprising a vacuum tube diode having an inherent internal electromotive force, a source of constant voltage, a calibrated potentiometer having a resistance means connected across said constant voltage source, a movable brush for said resistance means to provide a plurality of known voltage drops thereacross, an additional resistance means included in series with said potentiometer resistance means and said constant voltage source for providing a compensating voltage to balance out said inherent internal electromotive force, and means connecting said potentiometer and additional resistance means in series with said diode.

2. The combination of claim 1 wherein said additional resistance means is variable, a second variable resistance means, identical with said additional resistance means, also connected in series with said potentiometer resistance means and said constant voltage source, and a means for simultaneously varying said two variable resistance means whereby the sum of their resistances is substantially constant.

3. A calibration circuit for calibrating peak voltmeters comprising a variable peak voltage source having a wave form substantially the same as that to be measured by the meter to be calibrated, a pair of terminals for connection to said meter, means connecting said source to said terminals, and a voltage limiter connected across said terminals, said limiter comprising a vacuum tube diode having an inherent internal electromotive force, a source of direct voltage connected in series opposing relation to said diode to balance out said internal electromotive force, a source of variable direct voltage also connected in series with said diode and with polarity opposing conduction therethrough, and means for indicating the magnitude of said variable direct voltage.

References Cited in the file of this patent

UNITED STATES PATENTS

| 1,825,304 | Burnside | Sept. 29, 1931 |
| 2,079,485 | Bousman | May 4, 1937 |